United States Patent Office 3,285,912
Patented Nov. 15, 1966

3,285,912
SUBSTITUTED DIPHENYL KETONES
Frank P. Palopoli, Glenside, Pa., and Vernon J. Feil, Jamestown, N. Dak., assignors to Richardson-Merrell Inc., New York, N.Y., a corporation of Delaware
No Drawing. Filed Oct. 21, 1963, Ser. No. 317,812
5 Claims. (Cl. 260—246)

This invention relates to a novel class of Mannich derivatives of diphenyl ketones. The compounds of the present invention are useful as intermediates for the production of physiologically active compounds having valuable combinations of properties.

The class of compounds contemplated by the present invention are Mannich derivatives corresponding to the formula:

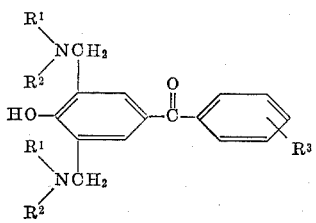

wherein $R^1$ and $R^2$ are lower aliphatic groups containing from one to about five carbon atoms, and $R^1$ and $R^2$ taken together form a heterocyclic group with the nitrogen to which they are attached; and $R^3$ is a member selected from the group consisting of hydrogen, lower alkyl, lower alkoxyl, halogen, and trifluoromethyl.

The groups $R^1$ and $R^2$ include methyl, ethyl, propyl, n-butyl, isobutyl, and the like, and when $R^1$ and $R^2$ are taken together, they can form groups such as morpholino, piperidino, N-methyl piperazino, pyrrolidino, and the like.

$R^3$ includes groups such as methyl, ethyl, pentyl, methoxy, propoxy, isobutoxy, chlorine, bromine, fluorine, iodine, trifluoromethyl, and the like.

The compounds of the present invention can be prepared by reacting a suitable ketone with an amine and formaldehyde under Mannich reaction conditions:

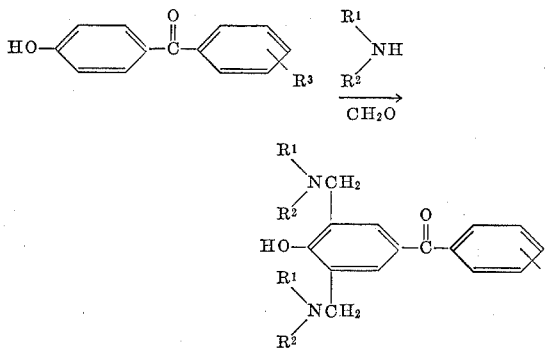

In order to produce the bis-Mannich derivatives, it is necessary to employ 2 equivalents or more of each of the amine and formaldehyde reactants per equivalent of the phenolic ketone starting material.

The conversion of the phenolic ketones into the invention compounds is preferably carried out by dissolving the ketone in a solvent such as methanol, ethanol, dioxane, or similar medium, and adding the appropriate amine and formaldehyde to this solution. The reaction is conducted at room temperature or at temperatures up to the reflux temperature of the solvent for a period of time between about 2 and 24 hours depending on the reaction temperature employed and the reactivity of the amine employed.

If desired, the products of the present invention, which and utilized as such. The compounds of the present invention may also be obtained as salts formed with an acid such as hydrochloric acid, hydrobromic acid, citric acid, oxalic acid, maleic acid, and the like.

The invention compounds are useful for the production of pharmaceutical products which are distinguished by their anti-inflammatory, pituitary gonadotrophin inhibiting and estrogenic activity.

The conversion of the invention compounds into biologically active triaryl ethanol derivatives can be accomplished are oils, can be converted into solid acyloxy derivatives by the reaction of a suitable benzylmagnesium halide with an invention compound in a solvent such as anhydrous ether:

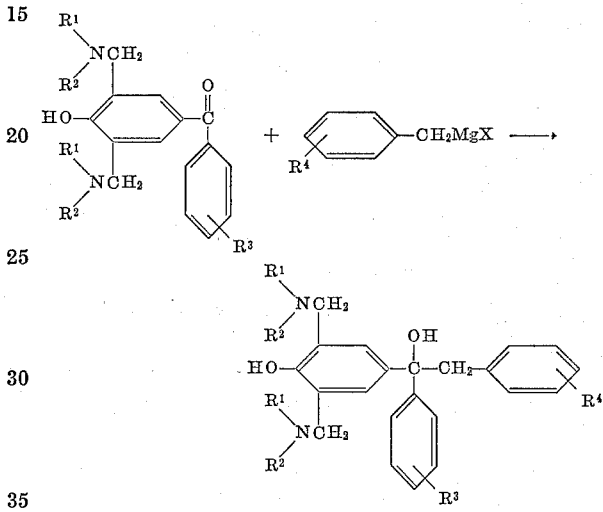

wherein $R^1$, $R^2$ and $R^3$ are the same as defined hereinabove, and $R^4$ is the same as $R^3$.

The compounds of the present invention will be further illustrated by reference to the following examples.

EXAMPLE 1

3,5-bis(dimethylaminomethyl)-4-hydroxy-4'-methylbenzophenone

To a solution of p-hydroxy-p'-methylbenzophenone (106 grams, 0.5 mole) in 300 milliliters of ethanol and 198 grams of 25 percent aqueous dimethylamine (1.1 mole) was added 89.2 grams of 37 percent formalin (1.1 mole). The solution was refluxed for three hours, then the ethanol was partially removed at reduced pressure. The solution was cooled, the solid which precipitated was removed by filtration, washed with cold ether and recrystallized from ethanol to yield 3,5-bis(dimethylaminomethyl) - 4 - hydroxy-4'-methylbenzophenone, M.P. 128–130° C.

EXAMPLE 2

3,5-bis(dimethylaminomethyl)-4-hydroxybenzophenone

When p-hydroxy-p'-methylbenzophenone was replaced with p-hydroxybenzophenone in the Mannich reaction of Example 1, 3,5 - bis(dimethylaminomethyl)-4-hydroxybenzophenone was obtained as an oil. This oil was treated with an excess of alcoholic hydrogen chloride and the product was crystallized from methanol to give 3,5-bis(dimethylaminomethyl)-4-hydroxybenzophenone dihydrochloride, M.P. 210–213° C. The monohydrate melts at 230–233° C.)

EXAMPLE 3

3,5-bis(morpholinomethyl)-4-hydroxybenzophenone

When dimethylamine was replaced with morpholine and p-hydroxy-p'-methylbenzophenone was replaced with p- hydroxybenzophenone in the Mannich reaction of Example 1, 3,5-bis(morpholinomethyl) - 4 - hydroxybenzophenone was obtained, M.P. 150–152° C., from ethanol.

EXAMPLE 4

*3,5-bis(piperidinomethyl)-4-hydroxybenzophenone*

When p-hydroxy-p'-methylbenzophenone was replaced with p-hydroxybenzophenone and dimethylamine was replaced with piperidine in the Mannich reaction of Example 1, 3,5-bis(piperidinomethyl)-4-hydroxybenzophenone was obtained, M.P. 86–90° C., from ethanol.

EXAMPLE 5

*3,5-bis(diethylaminomethyl)-4-hydroxy-2'-trifluoromethylbenzophenone*

In the same manner as Example 1, the Mannich reaction between diethylamine, formaldehyde, and p-hydroxy-O'-trifluoromethylbenzophenone yields 3,5-bis(diethylaminomethyl)-4-hydroxy-2'-trifluoromethylbenzophenone.

EXAMPLE 6

*3,5-bis(dibutylaminomethyl)-4-hydroxy-4'-methoxybenzophenone*

In the same manner as Example 1, the Mannich reaction between dibutylamine, formaldehyde, and p-hydroxy-p'-methoxybenzophenone yields 3,5-bis(dibutylaminomethyl)-4-hydroxy-4'-methoxybenzophenone.

EXAMPLE 7

*3,5-bis(methylethylaminomethyl)-4-hydroxy-3'-chlorobenzophenone*

In the same manner as Example 1, the Mannich reaction between methylethylamine, formaldehyde, and p-hydroxy-m'-chlorobenzophenone yields 3,5-bis(methylethylaminomethyl)-4-hydroxy-3'-chlorobenzophenone.

What is claimed is:

1. A compound of the formula:

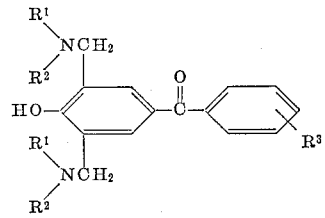

wherein $R^1$ and $R^2$ are lower alkyl groups having from one to five carbon atoms, and $R^1$ and $R^2$ taken together with the nitrogen to which they are attached form a heterocyclic ring of the group consisting of morpholino, piperidino, N-methyl piperazino, and pyrrolidino; and $R^3$ is selected from the group consisting of hydrogen, lower alkyl, lower alkoxyl, halogen, and trifluoromethyl.

2. 3,5-bis(dimethylaminomethyl)-4-hydroxy-4'-methylbenzophenone.

3. 3,5-bis(dimethylaminomethyl) - 4 - hydroxybenzophenone.

4. 3,5-bis(morpholinomethyl) - 4 - hydroxybenzophenone.

5. 3,5-bis(piperidinomethyl)-4-hydroxybenzophenone.

No references cited.

ALEX MAZEL, *Primary Examiner.*

HENRY R. JILES, *Examiner.*

J. TOVAR, *Assistant Examiner.*